SELF-CONTAINED CABLE PRESSURE INDICATING SYSTEM
Filed July 30, 1963
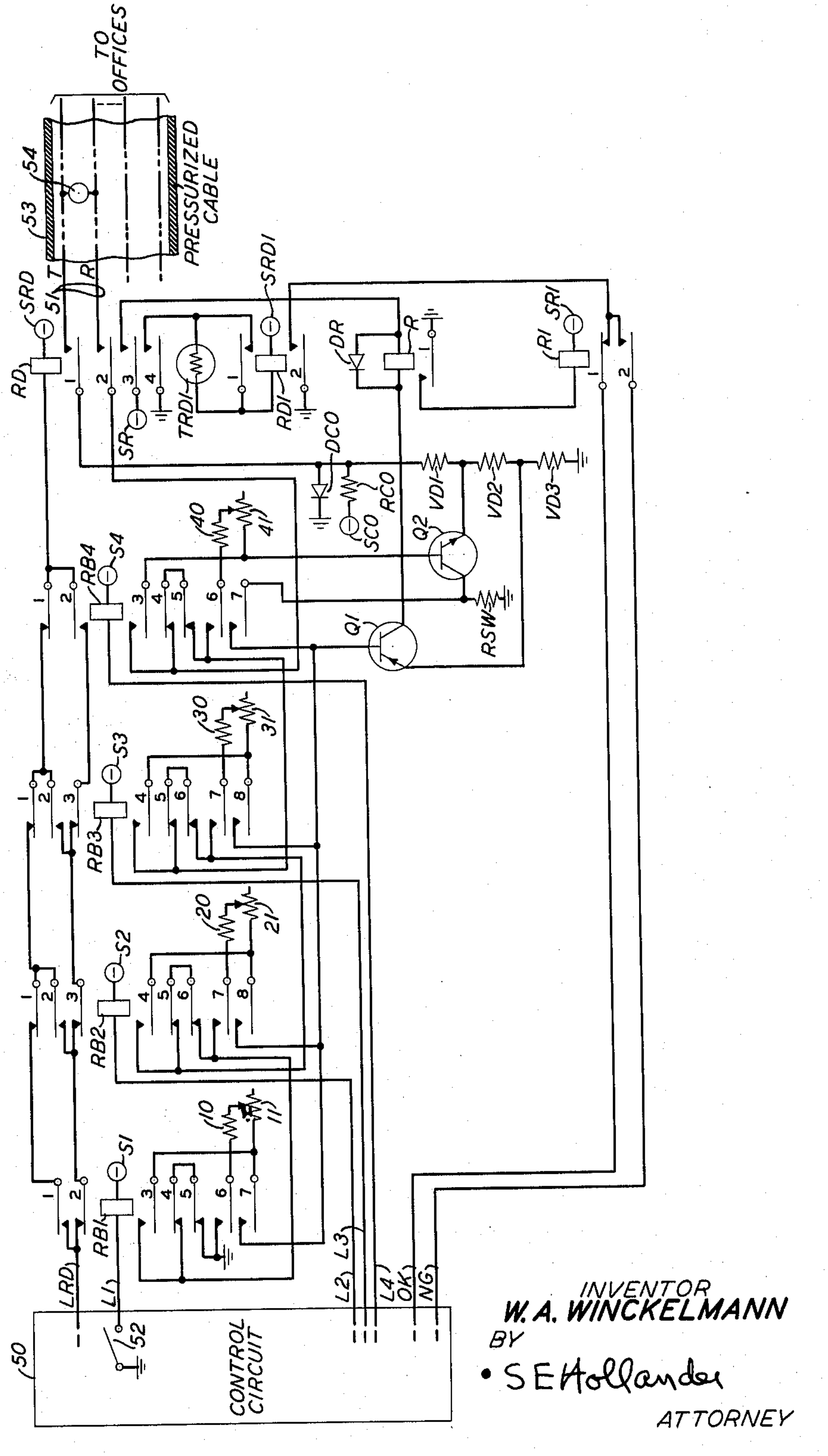
INVENTOR
W. A. WINCKELMANN
BY
S E Hollander
ATTORNEY 3,259,892
SELF-CONTAINED CABLE PRESSURE INDICATING SYSTEM William A. Winckelmann, Lincroft, N.J., assignor to Bell Telephone Laboratories, Incorporated, New York, N.Y., a corporation of New York Filed July 30, 1963, Ser. No. 298,770
8 Claims. (Cl. 340—242)

This invention relates to testing systems and more particularly to a cable pressure indicating arrangement.

With the recognized rapidly expanding usage of telephone systems and their many and varied attendant circuit arrangements, with no foreseeable slowdown in such expansion, one of the prime requisities to maintain a steady growth rate is efficient and proper central and branch office interconnecting structures. Proliferation of such interconnections is further exemplified by the many new line and trunk facilities that are placed into service each year within such offices and in the so-called outside plant area. As regards the latter, and to some extent certainly the former also, one of the most successful and proven expedients to date has been the utilization of protective telephone cables enclosing many office intercommunicating paths. For example, one such cable might enclose facilities for interconnecting subscribers from two or more distinct offices over an illustrative number of 36 separate communication paths. In addition the entire country depends on the many coaxial cable systems which provide essential communication links between many areas. A relatively recent development has been the high speed transmission of data over voice channels; the protection afforded such lines by cable enclosure is perhaps even more important here, due to the need to maintain a high degree of transmitting accuracy.

In such a framework of subscriber and office cable-enclosed interconnections, it is clear that proper and adequate customer service depends on regular and careful maintenance of these cables to avoid faults which might ordinarily be caused by breaks in the cable sheath due to such factors as the effects of the weather, accidental breaking or disruption of the cable's continuity, or even "malicious mischief." Such damage to cables has been known to short circuit many if not all of the telephone "pairs" included therein, due to water or other moisture damage to cite just one such cause.

To avoid such damaging effects is, of course, one responsibility of those involved with materials development; that is, to produce, for example, tough new plastics or so-called armored cable, capable of withstanding many otherwise deleterious effects such as heat, moisture and external pressure. On the other hand, however, despite the rigorous standards and limits set by manufacturing groups in their quality control operations, faults in cable still inevitably occur in a not inconsiderable amount. Organized detection and location of such faults is therefore of paramount importance to maintenance groups responsible for relieving such problems. One particularly successful and expeditious arrangement in achieving such detection has been to pressurize the cables from within and then to monitor cable pressure at some central location suitably equipped with facilities to serve several common areas. Quite often, such test centers are located directly in telephone central offices, in which event maintenance people have access to all the necessary equipment, both automatic and manual, to achieve such testing objectives.

Rather than going through the burdensome operation of measuring the cable pressure itself, accurate determinations of the pressures at various locations within the cable can be made by measuring the electrical impedance (usually resistance) of various types of pressure-responsive contactors and transducers coupled to particular predetermined lines within the cable. With a knowledge of the location of such an element across a particular line with accompanying data on which line is being tested, the pressure at any particular point within a relatively long and perhaps otherwise unmeasurable cable can be determined. These testing elements exhibit particular impedance values across their terminals in response to the variations in pressure in their environment. An appropriate impedance measuring apparatus connected across these terminals may determine the resistance reading and therefore the pressure desired.

Certain prior art arrangements, however, in their desire to integrate some of the complex testing equipment into existing central office apparatus, for example, have depended upon extremely complex circuitry; these additional complexities introduced into a testing arrangement are inherently partially self-defeating of the very purpose sought to be achieved with such a detection arrangement. One particular disadvantage of some of these arrangements has been the requirement of many additional electrical detecting devices in the centrally located testing apparatus. Usually, there is included at least one such device for each possible type of fault that may occur in the cable (e.g., pressure too high, pressure too low, missing transducer, etc.). In addition, the mere placement of pressure-responsive elements across randomly chosen lines in a cable may make fault detection and location difficult and tedious, and furthermore, may require manual supervision and excessive maintenance, again a result diametrically opposed to that actually desired.

It is therefore an object of this invention to provide an improved cable fault indicating system.

Another object of this invention is to provide such a system with less complex detecting circuitry.

An additional object of this invention is to advantageously utilize electrical detecting devices for more than a single purpose, the function to be served to depend on the test being performed.

Still another object of this invention is to furnish an automatically controllable testing arrangement.

One particular illustrative embodiment of this invention provides for an automatically controllable indicating system for measuring various ranges of pressure existing, for example, within a telephone cable which encloses a plurality of communicating lines or paths. The pressure ranges are represented electrically by corresponding resistance ranges or "bands," exhibited by pressure responsive transducers and contactors disposed across selected lines in the pressurized cables. For a given range, a signal from a control circuit switches in appropriate circuitry for that particular range by the operation of a first relay; a second control signal thereupon results in the attachment to the test circuit of the particular line across which the representative resistance is to be measured, such line attachment being similarly achieved by the operation of a second relay. After this controlled or "programmed" switching is completed, the circuit is prepared to operate and at this point, is generally analogous to a bridge circuit, two of the arms of the bridge being respectively the resistance across the selected line, and the series combination of a fixed resistor and a variable resistor for each range selected.

The electrical detecting devices utilized to determine the particular deviations of selected line pressures (resistances) are in this particular embodiment two transistors. For a first group of ranges, a first of these transistors is used exclusively and functions as a "detector" so as to determine whether the representative resistance across the selected line in this first group of ranges is below a predetermined minimum value. If such is in fact the case, a signal applied to the base of the first transistor will be sufficient to turn it on and thereby operate check circuitry connected to the collector of that transistor, with an alarm signal ultimately being delivered to a control circuit to indicate a line fault. It is clear that suitable automatic means may be provided in such a control circuit to sequentially record both the lines to be detected and the corresponding check circuit indications with respect to each of these lines as they are tested.

The second transistor is only relied upon when the circuit operates to test another group of ranges where the resistance across the lines therein can be expected to attain relatively high values. In this embodiment of the invention, such a group of ranges is represented symbolically by a single illustrative range, and the test being performed thereon involves for example, the determination of whether any transducers across the selected line are completely missing; this situation might obtain subsequent to certain maintenance operations on the cable itself, such as splices or repair work, or perhaps even due to certain natural phenomena. However, when a transducer is missing from a line or has attained a representative resistance which exceeds a predetermined maximum value in this second group of ranges, the first transistor mentioned above would ordinarily receive an insufficient energizing signal (the high resistance causing a very low current to flow) on its base to properly operate the required check circuitry. Therefore, for this second higher range, the signal is applied to the base of the second transistor which takes over the detecting function normally served by the first transistor. The second transistor turns on and by the coupling of its output circuit to the base of the first transistor through a contact on the high range switching relay, the first transistor now in fact functions as an amplifier to amplify the otherwise insufficient amplitude signal and thereby activate the check circuit to indicate a fault condition.

It may be noted that the utilization of the first transistor with respect to this higher range obviates the need for additional connecting circuitry to the check circuit, since the same connections that serve to activate the check circuit in the first group of ranges are again utilized for the second group. A further notable point is that while for the first group of ranges the system operates to detect a line resistance below a predetermined minimum, for the second group of ranges, by the interconnection of the two transistors, the system operates to detect a representative line resistance above a predetermined maximum.

It is therefore a feature of this invention that common detection equipment includes means for determining whether the pressure in a pressurized cable is of an appropriate predetermined value both by detecting whether the resistance values of transducers and contactors on cable-enclosed lines are below predetermined minimums or above predetermined maximums, and includes facilities for causing a normally detecting transistor to amplify certain signals, depending upon the testing range selected.

A more complete understanding of this invention may be acquired from the following description, the appended claims and the single drawing in which is depicted one illustrative embodiment of a pressure measuring arrangement in accordance with my invention.

*Apparatus description*

The testing circuit comprises, in the illustrative embodiment shown in the attached drawings, four ranges, each of which is adapted to test for a particular pressure level within a cable. Each range's circuitry only becomes actively attached to the testing circuit upon the operation of the respective control relays RB1, RB2, RB3, and RB4 by virtue of a control signal from control circuit 50 over leads L1, L2, L3, and L4, respectively. Symbolic switch 52 in control circuit 50, the closure of which operates relay RB1 over lead L1, is representative of similar switching arrangements connected to leads LRD, L2, L3 and L4. A sample or illustrative cable-enclosed line across which either a contactor or a transducer is disposed is line 51, the tip and ring conductors of which are respectively indicated as T and R. Line 51 is illustrated as enclosed by pressurized cable 53. In addition, element 54 is a symbolic representation of a pressure-responsive transducer or contactor which provides, across tip and ring conductors T and R of line 51, an impedance corresponding to the pressure within cable 53. Following the operation of any of the four control or resistance band relays RB—, the control circuit 50 activates relay RD over lead LRD and thereby attaches line 51 to the modified bridge circuit.

The two transistor detecting devices are Q1 and Q2, the former serving as a detector when any one of the relays RB1, RB2, or RB3 is operated, and the two transistors serving in conjunction with one another as amplifier and detector respectively when resistance band relay RB4 (for the high range) is operated. Biasing for the two transistors is provided from negative battery SCO through resistor RCO, such voltage being diode-controlled by breakdown device DCO. Source SCO may advantageously be the ordinary telephone central office battery. A voltage divider consisting of resistors VD1, VD2, and VD3 provides a reverse bias to the emitter of transistor Q1 and a slight forward bias to the emitter of transistor Q2. The voltage divider in fact represents the so-called "ratio arms" of the bridge, so that two of the arms are represented at all times by the voltage divider, with the third arm being the combination resistor and rheostat of a particular range (e.g., fixed resistor 10 and variable resistor 11 in range 1), with the unknown arm being represented by the resistance of a pressure responsive contactor or transducer such as symbolic element 54 displayed across the tip and ring conductors T and R of illustrative line 51 in cable 53.

The check circuit, operated if at all from the collector of transistor Q1, includes major elements such as thermistor TRD1, relay RD1, relay R, and relay R1. When a line the resistance across which is above the predetermined minimum for ranges 1 through 3 or below the predetermined maximum for range 4 is connected into the circuit, the Q1 transistor provides insufficient current from its collector to operate relay R, relay R1 remains normal, and the eventual operation of relay RD1 through delay thermistor TRD1 thereby connects ground through contact 2 of relay RD1 and normal contact 1 of relay R1 to the "OK" lead of the control circuit. Should a fault condition be identified, the operation of relay R, operating relay R1, and the subsequent operation of relay RD1 delivers a similar indication to the control circuit 50 over fault indicating lead NG.

*Detailed description of operation*

The pressure ranges which the corresponding resistance bands represent can take on a multiplicity of values, depending upon the elements connected across the selected lines to be tested. An illustrative table of suggested resistance and pressure values is indicated below.

| Range No. | Pressure (p.s.i.) | Representative Resistance |
|---|---|---|
| 1 | 1.0 | 150 Kilohms. |
| 2 | 2.0 (Operated Contactor) | 234 Kilohms. |
| 3 | 3.0 | 400 Kilohms. |
| 4 | Indeterminate—due to missing transducer. | 4 Megohms (or above). |

It is clear that this is a flexible arrangement dependent only upon the capabilities of the contactors and transducers utilized, and that an additional number of ranges can certainly be tested as long as corresponding discrete representative resistances can be exhibited across particular lines, and additional reference arms comprised of fixed and variable resistors can be switched into the bridge.

Since ranges 1 through 3 operate practically identically in that they each detect a representative resistance that must exceed a predetermined minimum in order to avoid alarming the check circuit, it is felt that a detailed description of the operation of range 1 will suffice for the purposes of this specification. In order to commence the testing cycle, the switching in of the so-called reference arm of range 1, comprising resistors 10 and 11, as well as additional switching steps is accomplished by a control signal delivered through symbolic switch 52 in control circuit 50 over lead L1 to potential source S1 through the winding of relay RB1. This can be seen to connect one end of the fixed resistor 10 to ground over contact 6 of relay RB1 and to connect the fixed terminal of variable resistance 11 to the base of transistor Q1 over contact 7 of relay RB1; this same fixed terminal of resistor 11 is also connected through to contact 2 of the RD relay over a circuit traceable from contact 3 of relay RB1 (operated), contacts 6 and 5 respectively of relay RB2 (normal), contacts 6 and 5 of relay RB3 (normal), and contacts 5 and 4 of relay RB4 (normal). However, the connection to line 51 is not yet completed due to the normal released state of relay RD.

The operation of relay RD can now be achieved due to the prior operation of the range 1 resistance band relay RB1. A control signal from control circuit 50 serves to energize the winding of relay RD over an electrical path including lead LRD, and contact 1 of each of relays RB1 through RB4 through this winding to potential source SRD. The operation of relay RD in effect sets up the entire bridge circuit. Tip conductor T of illustrative line 51 is connected to one terminal of the VD1–VD2–VD3 voltage divider over contact 1 of relay RD; ring conductor R is connected over the path previously traced out to the fixed terminal of variable reference resistor 11 in range 1 over now operated contact 2 of relay RD; potential source SR is connected to the right-hand terminal of the winding of relay R over contact 3 of relay RD in order to allow any subsequent turning on of transistor Q1 to energize the winding of relay R (diode DR protects transistor Q1 by providing a discharge path for the magnetic field of relay R when relays RD and RB1 release); and ground is connected to the right-hand terminal of thermistor TRD1 over contact 4 of relay RD. Element TRD1 provides a delay to prevent the immediate operation of relay RD1 and to allow a steady state condition to materialize; relay RD1 does, however, operate after an illustrative time interval of approximately 1.5 seconds.

The circuit as now constituted, with relays RBI and RD operated, can be analogized to the typical four arms of a bridge circuit as follows: Arm 1 includes reference resistors 10 and 11; arm 2 includes a portion of the voltage divider circuit, for example resistor VD3, connected between the emitter of transistor Q1 and ground; the third arm can be thought of as comprising the remaining two portions of the voltage divider, i.e., resistors VD1 and VD2; and the fourth or usually "unknown" arm is the representative resistance exhibited across the selected line, in this case across tip and ring conductors T and R of illustrative line 51 by symbolic pressure-responsive element 54. The voltage source which usually is connected across a diagonal of the bridge is the potential difference between source SCO (regulated by diode DCO and resistor RCO) and ground, and finally, the detecting device which often appears across the other diagonal of a bridge circuit can be visualized in this instance as transistor Q1 whose emitter is connected to a point between voltage divider elements VD2 and VD3 and the base of which is connected over a path previously traced out to the common connection of ring conductor R of line 51 and the fixed terminal of variable resistor 11 in range 1. The collector of transistor Q1 is connected to relay R of the check circuit. It is to be noted that in this range, as well as in ranges 2 and 3, transistor Q2 plays no part in the circuit operation. That is, it is initially in the off condition, its base circuit is open-circuited and there is merely some collector-emitter voltage difference which is of no great concern at this juncture.

*Circuit operation—range 1*

Referring to the above table, it may be seen that in range 1, a transducer pressure of 1.0 pound per square inch will be represented by a resistance of approximately 150 kilohms. When testing a line within this range, the circuit operates to activate the alarm circuit and thereby inform the control circuit 50 over lead NG when the transducer pressure falls below 1.0 p.s.i., that is, when the representative resistance is below 150 kilohms. If the resistance is above 150 kilohms, the pressure exceeds 1.0 p.s.i. and a "no-fault" indication over lead OK will obtain.

The initial activating signal for range 1 is produced by the closure of symbolic switch 52 in control circuit 50; energizing current thus flows over lead L1 through the winding of relay RB1 to potential source S1. The operation of relay RB1 prepares an operating path for relay RD which is then operated by a signal from control circuit 50 over lead LRD and further over a path traced out above to negative potential source SRD. Thus, after relays RB1 and RD have operated in sequence, the detection circuit is completely set up as traced out supra.

Assuming in the first instance that the pressure in cable 53 in which representative line 51 is located, exceeds 1.0 p.s.i. and that therefore the resistance displayed by pressure-responsive element 54 across line 51 exceeds 150 kilohms, the voltage obtaining at the base of transistor Q1 will be insufficient to turn on that transistor. Consequently, no output signal sufficient to operate relay R from the collector of transistor Q1 will exist and that relay will remain unoperated through the remainder of this assumed test cycle. As regards providing the indication to the control circuit 50 that no fault exists in the cable, after the passage of an illustrative time interval of approximately 1.5 seconds, when thermistor TRD1 reaches to its low impedance condition, ground, connected from contact 4 of relay RD through thermistor TRD1 and the winding of relay RD1 to potential source SRD1, operates relay RD1. The operation of relay RD1 has two major effects. The first of these involves the closure of contact 1 of relay RD1 which places a short circuit around the TRD1 thermistor thereby allowing thermistor TRD1 to cool so that its thermal delay function will be effective on subsequent tests, and insuring a permanent continuous ground connection to keep relay RD1 operated throughout this part of the testing cycle. The second effect pertains of course to the operation of contact 2 of relay RD1, whereby ground is connected therethrough to the "swinger" of relay R1. Since relay R1 has not operated due to the still normal condition of relay R, this last-mentioned ground connection passes from the swinger of relay R1 over normally closed contact 1 of relay R1 and over lead OK to control circuit 50, thereby providing the control circuit with an indication that no fault exists in the cable in this range (range 1). It will be apparent to those skilled in the art that suitable automatic recording means may be provided in control circuit 50 (e.g., tape recorders, etc.) to record such indication.

On the other hand, should the pressure in cable 53 in which line 51 is located fall below the predetermined minimum of 1.0 pound per square inch when this test is conducted, the corresponding representative resistance will fall below 150 kilohms. In such a situation, the modified bridge circuit set up as above after the operation of relays RB1 and RD operates slightly differently. That is, the voltage provided to the base of transistor Q1 is now sufficient to turn that transistor on. An operate path now exists for relay R in the check circuit, such path being traceable from ground connected to voltage divider resistor VD3, through the emitter-collector circuit of transistor Q1, through the winding of relay R and to negative potential source SR through operated contact 3 of relay RD. Relay R now operates and in so doing provides an operating path for relay R1 from ground through operated contact 1 of relay R and through the winding of relay R1 to potential source SR1. Relays R and R1 are arranged to have operated prior to the passage of the illustrative 1.5 second interval required by thermistor TRD1 to be fully conductive and therefore also prior to the operation of relay RD1. When relay RD1 finally does operate, the locking path provided by its contact 1 (short-circuiting thermistor TRD1) between ground and source SRD1 through contact 4 of relay RD is the same as in the cycle described above. However, when ground passes from contact 2 of relay RD1 to the swinger of relay R1, relay R1 has already operated so that the ground signal is delivered over contact 2 of relay R1 to the control circuit 50 over lead NG to indicate that a fault situation exists in the cable location under test. It will be appreciated that ranges 2 and 3 operate in a similar manner.

*Circuit operation—"high" range 4*

One of the unique features of this invention relates to the operation of that group of ranges designed to detect resistances above a predetermined maximum value such as that which would be present if a transducer were entirely absent from the line erroneously. Such a "missing transducer" test can be conducted by utilizing range 4 of the instant invention, the initial switching of which is effected by a control signal from control circuit 50 over lead L4 through the winding of resistance band relay RB4 to potential source S4. After relay RB4 has thereby operated, an operate path is prepared for relay RD so that the line to be tested, again illustrative line 51, may be switched into the circuit. This path is seen to exist from the control circuit 50 over lead LRD and thereafter through normally closed contact 2 of relay RB1, normally closed contacts 3 of relays RB2 and RB3, and operated contact 2 of relay RB4 through the winding of relay RD to source SRD.

The operation of relay RD sets up the modified bridge circuit in a slightly different form from that described with respect to the first three ranges supra. In this situation, the analogy to the four bridge arms is as follows: The first arm may be said to include resistance elements VD2 and VD3 of the voltage divider; the second (this together with the first arm may be thought of as forming the "ratio arms" of the bridge) would then be the VD1 resistance element; the third arm is the so-called reference arm and as regards range 4 consists of resistors 40 and 41; the unknown fourth arm is again the resistance (or open circuit if the transducer is missing) between tip and ring conductors T and R of illustrative line 51.

Across one diagonal of the bridge from a point common to resistance element VD1 and tip conductor T of line 51 to the ground connected to resistance element VD3, is the potential source SCO regulated by resistance RCO and diode DCO. Across the other diagonal of the bridge is a combined connection of transistors Q1 and Q2. That is, the base of transistor Q2 is connected to the fixed terminal of variable resistor 41 and at the same time to ring conductor R of illustrative line 51. The emitter of transistor Q2 is connected to a point intermediate voltage divider elements VD1 and VD2, and the collector of transistor Q2 has its output signal, exhibited across resistor RSW, connected through operated contact 7 of relay RB4 to the base of transistor Q1. The connections of transistor Q1 to the check circuit previously adverted to are the same and many additional and complex connections are thereby avoided by again utilizing transistor Q1 although in a slightly different capacity.

As has been indicated in the above table, range 4 is utilized to detect a resistance value "above 4 megohms;" assuming initially that the transducer 54 is present across the tip and ring conductors T and R of illustrative line 51, the resistance presented thereacross will be some figure below 4 megohms (depending on the pressure in cable 53) for example, 900 kilohms. Under these circumstances, forward-biased transistor Q2 will have its base negative with respect to the emitter thereof and will therefore not turn on. Similarly, transistor Q1 will also remain in the off condition since it requires current flow in the collector circuit of transistor Q2 to provide an energizing base voltage and such is absent here. Therefore, relays R and R1 in the check circuit remain normal and nonoperated, and after the passage of the illustrative 1.5 second time interval after which relay RD1 operates, the ground signal from contact 2 of relay RD1 will be delivered from the swinger of relay R1 over contact 1 of relay R1 and lead OK to control circuit 50 to indicate that the transducer is still present across the line.

If, however, the transducer is in fact missing when the test is made, the resistance displayed to the testing circuit is essentially the very high leakage resistance of the line or in effect, an open circuit. The voltage appearing on the base of transistor Q2 will be positive with respect to the emitter bias and transistor Q2 turns on. Current flow in the collector circuit of transistor Q2 causes a voltage drop across resistor RSW sufficient in amplitude so that when it is impressed through closed contact 7 of relay RB4 on the base of transistor Q1, transistor Q1 in turn becomes energized. Similar to the description supra, an operating path is now provided for relay R and when that relay operates, relay R1 also operates. Thus, when relay RD1 operates after the time delay previously adverted to, the prior operation of relays R and R1 dictates that the ground signal passing from contact 2 of relay RD1 be delivered over contact 2 of relay R1 and over lead NG to control circuit 50 to indicate that the tested line is missing a transducer and that corrective maintenance is required.

The components in this embodiment may take the following illustrative values:

| | |
|---|---|
| Resistor 10 | 26.1 kilohms. |
| Variable resistor 11 | 25 kilohms maximum. |
| Resistor 20 | 46.4 kilohms. |
| Variable resistor 21 | 25 kilohms maximum. |
| Resistor 30 | 82.5 kilohms. |
| Variable resistor 31 | 50 kilohms maximum. |
| Resistor 40 | 147 kilohms. |
| Variable resistor 41 | 100 kilohms maximum. |
| Resistor VD1 | 6.8 kilohms. |
| Resistor VD2 | 200 ohms. |
| Resistor VD3 | 1 kilohm. |
| Resistor RSW | 50 kilohms. |
| Resistor RCO | 1 kilohm. |
| Diode DCO | Zener, 30 to 40 volt breakdown rating or equivalent. |
| Transistor Q1 | Western Electric 12H or equivalent. |
| Transistor Q2 | Western Electric 16B or equivalent. |
| All potential sources | —48 volts. |

It is to be understood that the above-described arrangements are illustrative of the applications and principles of the invention. Numerous other arrangements may be devised by those skilled in the art without departing from the spirit and scope of the invention.

What is claimed is:

1. A pressure indicating system comprising, in combination, a control circuit, a plurality of communicating line paths enclosed in a pressurized environment, means disposed across selected ones of said lines at selected locations for translating the pressure existing thereat into corresponding electrical impedance values falling within a plurality of ranges, detecting means including a first transistor operative when said impedance values are below a predetermined minimum in each of a first plurality of said ranges and a second transistor operative to energize said first transistor when said impedance values exceed a predetermined maximum in each of a second plurality of said ranges, electromechanical switching means responsive to signals from said control circuit for attaching selected ones of said line paths to said detecting means, and an alarm circuit interposed between said detecting means and said control circuit and responsive to said detecting means to transmit a signal indication to said control circuit if one of said impedance values falls without a corresponding one of said ranges.

2. An impedance testing circuit for determining the values of impedance elements in a plurality of ranges comprising a control circuit, a control relay for each of said ranges operative in response to signals from said control circuit, a potential source for developing a voltage drop across said elements, a first detecting device adapted to be energized if one of said impedance values in a first group of said ranges falls below a predetermined minimum for each of said ranges in said first group, a second detecting device adapted to be energized to cause said first detecting device to amplify said voltage drop if one of said impedance values in a second group of said ranges rises above a predetermined maximum for each of said ranges in said second group, and an alarm circuit responsive to the energization of said first detecting device to deliver an alarm signal to said control circuit.

3. A circuit in accordance with claim 2 wherein said first detecting device includes a first transistor, and wherein said alarm circuit includes a first relay operative after a predetermined time delay, a second relay operative in response to the energization of said first transistor, and a third relay responsive to the operation of said second relay to deliver said alarm signal to said control circuit.

4. A circuit in accordance with claim 3 including in addition a plurality of voltage-dividing resistors, a plurality of transmission paths to be tested, a plurality of contacts responsive to the operation of each said control relay, wherein said first transistor comprises a collector electrode connected to said second relay, a base electrode connectable to selected ones of said transmission paths through selected ones of said contacts and an emitter electrode connected to a first of said voltage-dividing resistors, said second detecting device including a second transistor comprising a base electrode connectable to selected ones of said transmission paths through selected ones of said contacts, a collector electrode connectable to said base electrode of said first transistor through additional ones of said contacts, and an emitter electrode connected to a second of said voltage-dividing resistors.

5. A circuit for monitoring a plurality of ranges of line impedance conditions representative of the integrity of gas pressurized cable comprising a check circuit, a plurality of subscriber lines within said cable, first detection means connectable sequentially and individually to said lines for energizing said check circuit to an alarm indication if said line impedance conditions in a first group of said plurality of ranges are below a first predetermined value in each of said ranges in said first group, second detection means connectable sequentially and individually to said lines, and means for delivering signals from said second detection means to said first detection means to cause said first detection means to energize said check circuit to said alarm indication if said line impedance conditions in a second group of said plurality of ranges are above a second predetermined value in each of said ranges in said second group.

6. A circuit in accordance with claim 5 including in addition a source of potential connectable to said lines, and voltage-dividing means connected to said source of potential, and wherein said first detection means includes a first transistor comprising an emitter electrode connected to said voltage-dividing means, a base electrode connectable to selected ones of said lines, and a collector electrode connected to said check circuit, wherein said second detection means includes a second transistor comprising an emitter electrode connected to said voltage-dividing means, a base electrode connectable to selected ones of said lines, and a collector electrode connectable to said base electrode of said first transistor, and wherein said signal delivering means includes a resistor coupled to said collector electrode of said second transistor and connectable to said base electrode of said first transistor.

7. A cable pressure measuring system comprising a plurality of pressurized cables, a plurality of communicating lines within said cable, and a plurality of pressure-responsive elements connected at selected locations across selected ones of said lines for translating the pressure at said locations into resistance values in a plurality of ranges; a bridge circuit, the first and second arms of said bridge circuit including a plurality of voltage dividing impedances, the third arm of said bridge circuit including a fixed and a variable resistance for each of said ranges, and the fourth arm of said bridge circuit including said translated resistance across each of said lines, a potential source connected across one diagonal of said bridge circuit, a first transistor connectable across the other diagonal of said bridge circuit, and a second transistor connectable to said first transistor; a control circuit, a resistance band relay individual to each of said ranges and responsive to a control signal from said control circuit to connect said third arm into said bridge circuit and to connect said first transistor across said other diagonal of said bridge circuit for a first group of said plurality of ranges and to connect said first transistor across said other diagonal and said second transistor to said first transistor for a second group of said plurality of ranges, and a connecting relay operative in response to a signal from said control circuit to connect said fourth arm into said bridge circuit; and a check circuit including an alarm signal source, a first relay operative, after the passage of a predetermined time interval, in response to the operation of said connecting relay, said first relay including at least one contact connectable to said alarm signal source, a second relay operative in response to the energization of said first transistor when said resistance of said fourth arm is below a predetermined minimum value for each of said ranges in said first group of said plurality of ranges and operative in response to the sequential energization of said second transistor and said first transistor respectively when said resistance of said fourth arm is above a predetermined maximum value for each of said ranges in said second group of said plurality of ranges, and a third relay responsive to the operation of said second relay to connect said alarm signal source to said control circuit.

8. A cable pressure measuring system comprising a pressurized cable having a plurality of conductors therein and at least one pressure responsive element connected across two of said conductors, a plurality of resistance elements, a first transistor, a second transistor, means for connecting a first grouping of said resistance elements and said pressure responsive element to form a first bridge circuit and for connecting said first transistor as a detector across said first bridge circuit to determine the resistance of said pressure responsive element below a first specified value, means for connecting a second grouping of said resistance elements and said pressure responsive element into a second bridge circuit, for connecting said second transistor as a detector across said second bridge circuit to determine the resistance of said pressure responsive element above a second specified value, and for connecting said first transistor as an amplifier to said second transistor, and output circuitry connected to said first transistor.

No referencecs cited.

NEIL C. READ, *Primary Examiner.*

D. MYER, *Assistant Examiner.*